United States Patent
Dinamani et al.

(10) Patent No.: US 8,447,667 B1
(45) Date of Patent: May 21, 2013

(54) METHODS, SYSTEMS AND ARTICLES FOR FACILITATING LOANS USING INCOME TAX REFUNDS

(75) Inventors: Vidya Dinamani, San Diego, CA (US); Richard Preece, San Marco, CA (US); Alan B. Tifford, San Diego, CA (US); David D. Taylor, Santa Barbara, CA (US)

(73) Assignee: Intuit Inc., Mountain View, CA (US)

( * ) Notice: Subject to any disclaimer, the term of this patent is extended or adjusted under 35 U.S.C. 154(b) by 92 days.

(21) Appl. No.: 13/192,154

(22) Filed: Jul. 27, 2011

(51) Int. Cl.
*G06F 17/22* (2006.01)
*G06Q 40/00* (2012.01)

(52) U.S. Cl.
USPC .............................................. 705/31; 705/38

(58) Field of Classification Search
None
See application file for complete search history.

(56) References Cited

U.S. PATENT DOCUMENTS

| | | | | |
|---|---|---|---|---|
| 4,890,228 A * | 12/1989 | Longfield | ....................... | 705/31 |
| 5,193,057 A * | 3/1993 | Longfield | ....................... | 705/31 |
| 5,772,251 A * | 6/1998 | Fleck | ............................ | 283/115 |
| 5,963,921 A * | 10/1999 | Longfield | ....................... | 705/31 |
| 6,064,983 A * | 5/2000 | Koehler | ......................... | 705/31 |
| 6,105,865 A * | 8/2000 | Hardesty | ....................... | 235/380 |
| 6,182,891 B1 * | 2/2001 | Furuhashi et al. | ............. | 235/379 |
| 6,202,052 B1 * | 3/2001 | Miller | ............................ | 705/31 |
| 6,473,500 B1 * | 10/2002 | Risafi et al. | .............. | 379/144.01 |
| 6,473,741 B1 * | 10/2002 | Baker | ............................ | 705/31 |
| 6,532,450 B1 * | 3/2003 | Brown et al. | ................... | 705/40 |
| 7,010,507 B1 * | 3/2006 | Anderson et al. | ............... | 705/31 |
| 7,127,425 B1 * | 10/2006 | Wilson | ............................ | 705/38 |
| 7,146,337 B1 * | 12/2006 | Ward et al. | ...................... | 705/38 |
| 7,257,553 B1 * | 8/2007 | Baker | ............................ | 705/31 |
| 8,145,556 B2 * | 3/2012 | Tealdi et al. | ..................... | 705/37 |
| 2001/0029482 A1 * | 10/2001 | Tealdi et al. | ..................... | 705/38 |
| 2003/0033241 A1 * | 2/2003 | Harari | ............................. | 705/38 |
| 2003/0061151 A1 | 3/2003 | Hershey | | |
| 2006/0036465 A1 * | 2/2006 | O'Donnell | ........................ | 705/1 |
| 2006/0059073 A1 * | 3/2006 | Walzak | ........................... | 705/35 |
| 2006/0136330 A1 | 6/2006 | DeRoy et al. | | |
| 2006/0200396 A1 | 9/2006 | Satterfield et al. | | |
| 2007/0027791 A1 | 2/2007 | Young et al. | | |
| 2007/0244779 A1 | 10/2007 | Wolff | | |
| 2008/0005001 A1 | 1/2008 | Davis et al. | | |
| 2008/0319895 A1 | 12/2008 | Lazerson | | |
| 2009/0150169 A1 | 6/2009 | Kirkwood et al. | | |
| 2009/0164363 A1 | 6/2009 | Ahlers et al. | | |
| 2010/0100469 A1 | 4/2010 | Buchanan et al. | | |
| 2010/0274710 A1 * | 10/2010 | Misraje et al. | .................. | 705/38 |
| 2012/0185375 A1 * | 7/2012 | Tealdi et al. | ..................... | 705/37 |

OTHER PUBLICATIONS

Office Action mailed Dec. 16, 2011, Interview Summary mailed Mar. 12, 2012, and Amendment filed Mar. 16, 2012, in U.S. Appl. No. 12/845,444, filed Jul. 28, 2010.
Office Action dated Jul. 17, 2012, Amendment dated Jul. 18, 2012 and Interview Summary dated Jul. 18, 2012 in U.S. Appl. No. 12/771,750, filed Apr. 30, 2010, (32 pages).
Final Office Action dated May 15, 2012 and Amendment dated Sep. 17, 2012 in U.S. Appl. No. 12/845,444, filed Jul. 28, 2010, (26 pages).
Office Action dated Jun. 13, 2012, Interview Summary dated Sep. 7, 2012 and Amendment dated Sep. 12, 2012 in U.S. Appl. No. 13/094,821, filed Apr. 27, 2011, (34 pages).

* cited by examiner

*Primary Examiner* — Mussa A Shaawat
(74) *Attorney, Agent, or Firm* — Vista IP Law Group LLP (57) ABSTRACT

Systems, methods and articles for online computerized methods and systems for facilitating a loan between a borrower and a lender in a financial services system having a loan processing application integrated with a tax return preparation application, in which a lender's tax refund is used to fund the loan. Tax returns are prepared for borrowers and for lenders using the tax return preparation application. The borrowers submits loan request to the system. The system asks lenders having a tax refund if they would like to loan the tax refund to other people and the system presents loan options to the lenders. If a lender likes a loan request, the lender instructs the system to enter into a loan for the request for a specified amount on agreed to loan terms, and the loan amount is then transferred to the borrower, funded by the tax refund.

22 Claims, 4 Drawing Sheets

METHODS, SYSTEMS AND ARTICLES FOR FACILITATING LOANS USING INCOME TAX REFUNDS

BACKGROUND

The invention relates to methods and systems for online financial services systems; and more particularly, to new methods and systems for facilitating a loan funded by a tax refund in connection with an electronic tax return preparation system.

Computerized (also referred to as "electronic") tax return preparation applications have become very popular and allow a user, such as a taxpayer or a tax professional, to prepare and electronically file a tax return using a computer. The tax preparation application may be a desktop application that resides and operates on the computer operated by the user or an online application that resides on a server that is accessible by the user's computer via a network such as the internet. The interface for a server based application can be an internet browser or specialized software residing on the local computer. Examples of desktop applications are TurboTax® software for PC and Mac, ProSeries® and Lacerte® tax preparation applications, which are known consumer and professional tax preparation applications available from Intuit Inc., Mountain View, Calif., H&R Block TaxCut software, available from H&R Block, Inc., Kansas City, Mo., and TaxACT® software available from $2^{nd}$ Story Software, Inc. Examples of online tax return preparation applications are Turbotax® Online, H&R Block Online tax prep, and TaxACT® Online.

Whether a desktop application or an online application, the use of the application to prepare a computerized tax return is basically the same. For example, certain tax preparation applications present a list of tax-related questions or data entry fields to the user as a series of interview screens or fillable forms, in response to which the user enters the appropriate data or answers if they are known. For example, certain interview screens or questions may relate to personal and family information such as the user's social security number, marital status, number of dependents, etc. Other interview screens and questions may relate the taxpayer's finances such as wages, retirement plan contributions, and social security, state and federal taxes that were paid or withheld as provided in Form-W2. The data fields of an electronic tax return may be entered in many other ways, as well. For example, data may be entered into the electronic tax return by filling in data fields in a fillable form, the data may be electronically imported from financial service providers of the taxpayer (such as banks, stock brokers, financial planners, etc.), the data may be transferred from another database on the computer or remotely stored on a different computer or storage device/server, and/or the data may be transferred from a previous year's tax return, or from any other suitable source.

Further, an electronic tax return may be a personal return, joint return, or business or corporate return, and the tax-related questions and/or data fields to be completed are customized for the type of tax return and taxpayer.

Upon entry of all of the taxpayer data, the tax preparation application calculates and prepares an electronic tax return. The completed electronic tax return will include the amount of tax payments made by the taxpayer, such as amounts withheld, estimated tax payments, and any tax credits due to the taxpayer. The completed electronic tax return will also include the total income tax due to be paid by the taxpayer. If the amount of tax payments exceeds the total income tax due, then the tax return indicates that a tax refund is due to the taxpayer. If the total income tax due exceeds the amount of tax payments, then the taxpayer owes an additional tax payment. The electronic tax return may then be formatted as necessary and electronically filed with a tax authority such as the Internal Revenue Service, a state tax authority, or other tax collecting entity, or it may be printed and mailed to the appropriate tax authority, or it submitted in any other suitable manner.

In the case of a tax return that indicates a tax refund due to the taxpayer, the taxpayer can choose to receive the tax refund in various ways. For example, the taxpayer can elect to have all or part of the tax refund applied as an estimated tax payment for the subsequent tax year, and/or the taxpayer can choose to have all or part of the tax refund paid back to the taxpayer as a direct deposit to a financial account of the taxpayer or a check sent to the taxpayer. Some tax preparation services also provide tax refund anticipation loans in which the service pays all or part of the refund to the taxpayer, and the taxpayer agrees to have the refund deposited into the service's account. The service may charge a fee and/or interest on the loan amount from the time of the loan disbursement until the refund is received by the service.

Various financial circumstances arise when an individual, couple, family or small business (collectively referred to as a "borrower" or "borrowers") has need for a relatively fast and simple unsecured loan. For instance, the borrower may be experiencing temporary financial hardship due to the loss of employment, an injury or disability preventing employment, or an unexpected expense, such as medical bills, a natural disaster, or other unforeseen loss. The borrower may seek a loan to pay their bills in order to avoid the negative consequences of failing to meet their financial obligations, such as foreclosure on a home, eviction from their rental property, loss of basic utilities such as electricity and water, having bills go to collections, etc. Moreover, missed payments may incur late penalties, high interest rates, and negative credit reports.

As another example of when a borrower may seek a loan, the borrower may simply desire to purchase something, but does not have the cash available, does not want to wait until the money is paid such as waiting for an upcoming paycheck, and/or does not want to go through the time-consuming process of applying for a formal loan at a bank or other financial institution.

In order to meet these loan needs, there exist a variety of sources of unsecured consumer loans. These small, uncollateralized consumer loans are often called microloans, as they typically involve loan amounts of less than $25,000. Several examples of microloan lenders include: lenders such as Cash-Call™ which provide short term unsecured loans, payday loan companies, credit card companies which allow cash advances on credit lines, certain banks and credit unions, and the like. The advantages of such loans generally include short and easy applications, low borrower qualification requirements, a quick approval process, and fast payment of the loan proceeds to the borrower. However, these types of microloans have high upfront fees and/or high interest rates making them very expensive to the borrower. These microloans are expensive for multiple reasons, including the fact that the loans are relatively small, the financial data for the consumer/borrower is limited making it difficult to assess the credit worthiness of the loan, and there is no collateral securing the loan. For instance, short term lenders such as CashCall™ charge interest rates having annual percentage rates (APR) that may exceed 120%. Payday loan companies typically charge a fee of over 9% for a two week loan, which equates to an APR of over 450%. Credit card companies generally charge an upfront cash advance fee of 3-4% and then an interest rate of 10-20%.

Accordingly, there is a need for improved methods and systems of providing microloans which alleviates some of the deficiencies of current microloan lending processes.

SUMMARY

The present invention is directed to methods and systems for facilitating a loan between a lender and a borrower by adding and/or integrating loan processing functionality into an electronic tax return preparation application. For instance, the lender and borrower in a loan transaction both complete tax returns on an online financial services system of a service provider, wherein the financial service system has an electronic tax return preparation. The financial services system analyzes the tax return data to assess the credit worthiness of the borrower and assign a credit score to a loan request from the borrower. The service provider enables the lender to view loan requests, including a credit score from other taxpayers using the service to prepare tax returns. If the lender decides to execute a loan to the lender, then the loan amount is transferred to the borrower, and is funded either directly or indirectly by the tax refund of the lender.

Therefore, in one embodiment of the present invention, a method for facilitating a loan between a borrower and a lender, comprises receiving borrower income tax return data, at a financial services system. As described above, the financial service system has an electronic tax return application for preparing tax returns. The financial services system prepares a borrower income tax return using on the borrower income tax return data.

The financial services system receives a loan request from the borrower. The loan request includes desired loan terms, such as the requested loan amount, interest rate, loan period, repayment schedule, and the like.

The financial services system also receives lender income tax return data, and prepares a lender income tax return using the lender tax return data. The financial services system determines whether the lender income tax return indicates a tax refund amount is due to the lender, and inquires whether the lender is interested in loaning some or all of the tax refund to a borrower. If the lender answers affirmatively, the system presents loan options to the lender. The loan options may be specific loan requests from borrowers, or certain desired loan criteria, such as loan amount, interest rate, loan period, location of borrower, reason for loan request, etc. A loan request includes loan terms, such as the amount of money requested by the borrower, the repayment schedule, interest rate, a credit rating for the borrower, and/or other loan terms. There are many possible methods of presenting the loan options for a loan to the borrower. As one example, the system may obtain desirable loan criteria from the lender, and then presents a list of specific loan requests from a plurality of borrowers which meet the loan criteria.

If the lender decides to execute a loan based on the loan options, the lender sends instructions which are received by the financial services system to execute a loan, wherein the loan is for the loan request from the borrower. The selection of the loan request of the borrower may be a direct selection by the lender from a list of loan requests presented to the borrower, or it may be automatically selected by the system because the loan request of the borrower meets the loan criteria selected by the lender. The loan is executed according to loan terms agree upon by the borrower and the lender, such as the terms in the loan request, or as modified by mutual agreement of the borrower and lender. The instructions also include authorization from the lender to use the lender's tax refund to fund the loan, which may be direct or indirect, as described below.

The loan is funded by the tax refund, which may be direct or indirect, as described below. The instructions include a lender loan amount to be loaned to the borrower. For instance, the lender may decide to loan an amount less than or equal to the full amount of money requested by the borrower. Typically, the lender loan amount is also less than or equal to the tax refund amount. The instructions also include authorization from the lender to use the tax refund based on the lender income tax return to fund the loan. Then, the system executes instructions for transferring the lender loan amount is transferred to the borrower according to the instructions from the lender.

As described above, the loan may be funded by the tax refund directly or indirectly. If it is direct, then the tax return includes instructions to send a specified amount of the lender's tax refund directly to the borrower. There are several indirect mechanisms. For instance, system may instruct the provider of the financial services system, such as a bank for the provider, to transfer the lender loan amount to the borrower, and prepares the tax return such that the tax refund is sent directly to the financial services provider. In this way, the borrower does not have to wait for the tax authority to send the refund based on the tax return. As another example, the system may execute instructions to have the lender assign the tax refund to be sent to the system provider, such as the bank for the provider, and after receipt of the tax refund the system provider transfers the lender loan amount to the borrower. There are other possibilities, some described below, but the present invention is not limited to any particular mechanism of funding the loan using the tax refund.

In another aspect of the present invention, the financial services system may approve or reject a loan request from a borrower based upon a review of the borrower's credit information, including the borrower's income tax return data (which may also include prior year tax history), employment history, existing loans, and/or credit rating from the consumer credit rating bureaus like Equifax™, Experian™, and Trans Union™, or corporate credit rating agencies and information services like Standard & Poor's™, Moody's™ and Dun & Bradstreet™. The system may also analyze this data to determine a credit score for the loan request related to the credit worthiness of the borrower, the risk of non-payment, ability of the borrower to repay, etc. The credit score may be included as part of the loan options presented to the lender.

In a further aspect of the present invention, the lender may use the tax refund to fund in whole, or in part, a plurality of loans to a plurality of borrowers. For example, the lender may choose to execute multiple loans, each with a small percentage of the tax refund. In this way, the lender can diversify the risk if one, or a few, of the borrowers defaults on repayment.

In yet another aspect of the present invention, the financial services system may include a bill pay system that is used to enable the repayment of the loan by the borrower to the lender. The bill payment system can be set up to transfer automatic payments from an account of the borrower to an account of the lender (or just send a check funded from the borrower's account) according to a repayment schedule that is part of the loan terms.

In still another aspect, the financial services system may allow the lenders to rate their experience with the borrower, as well as providing comments on the experience and the borrower. The system may also enable a borrower to provide updates to the lenders, such as when a payment is late, or that the borrower intends to make an early repayment.

Another embodiment of the present invention is directed to a financial services system for implementing any of the above-described methods for facilitating a loan between a borrower and a lender which is funded by a tax refund of the lender. In one embodiment, the financial services system comprises one or more computers, data storage servers, and a website server which is in communication with the internet. The computers have software and programming to implement the tax return and loan facilitation methods of the present invention, as described above. For example, the system may include computers having software configured to enable the preparation of an electronic tax return for the lender and borrower. The same computers, or different computers in operable communication with such computers, have software configured to enable the loan facilitation between the lender and borrower. Thus, the tax return application and loan application software may be integrated or separate. The computers, servers and website server are operably connected via a communication network. The system may also have a communication interface to communicate with other electronic devices, such as cellular communication devices like mobile phones, smart phones, and other portable cellular devices. The communication networks enable users to use the system by accessing the system through the internet and/or other electronic communication, such as text messaging.

The system may also be in communication with other sources of financial information, such as credit reporting bureaus, and the like, through a network, typically comprising a combination of private networks and secure internet connections, in order to communicate and access credit data.

The computer(s) of the system are configured to enable a website accessible by a user through the internet and other electronic communication devices, like cellular device, to utilize the financial services system to prepare tax returns and create loans. The financial services system is configured to perform at least one of the method embodiments of the present invention for example: (a) receiving borrower income tax return data; (b) preparing a borrower income tax return using the borrower income tax return data; (c) receiving lender income tax return data; (d) preparing a lender income tax return using the lender income tax return data; (e) determining that the lender income tax return indicates a tax refund amount is due to the lender; (f) receiving a loan request from the borrower, the loan request including loan terms, the loan terms including a requested loan amount; (g) presenting loan options to the lender; (h) receiving instructions from the lender to execute a loan, wherein the loan is to the borrower substantially according to the loan terms, the instructions including a lender loan amount to be loaned to the borrower, the lender loan amount being less than or equal to the requested loan amount, the instructions also including authorization from the lender to use a tax refund based on the lender income tax return to fund the loan; (i) executing instructions for transferring the lender loan amount to the borrower according to the instructions from the lender.

Another embodiment of the present invention is directed to an article of manufacture comprising a computer program carrier readable by a computer and embodying instructions executable by the computer to program a computer system to perform the steps of at least one of the method embodiments of the present invention, including, for example: (a) receiving borrower income tax return data; (b) preparing a borrower income tax return using the borrower income tax return data; (c) receiving lender income tax return data; (d) preparing a lender income tax return using the lender income tax return data; (e) determining that the lender income tax return indicates a tax refund amount is due to the lender; (f) receiving a loan request from the borrower, the loan request including loan terms, the loan terms including a requested loan amount; (g) presenting loan options to the lender; (h) receiving instructions from the lender to execute a loan, wherein the loan is to the borrower substantially according to the loan terms, the instructions including a lender loan amount to be loaned to the borrower, the lender loan amount being less than or equal to the requested loan amount, the instructions also including authorization from the lender to use a tax refund based on the lender income tax return to fund the loan; (i) executing instructions for transferring lender loan amount to the borrower according to the instructions from the lender.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Embodiments of the present invention are directed to online computerized methods and systems for facilitating a loan between a borrower and a lender in a financial services system having a loan processing application integrated with a tax return preparation application, in which a lender's tax refund is used to fund the loan. Tax returns are prepared for borrowers and for lenders using the tax return preparation application. The borrowers submits loan request to the system, each loan request indicating a borrower loan amount, and other loan terms such as interest rate, loan period, intended use of the loan. The system uses the income tax return data of the borrower to assess the loan risk and credit worthiness of the borrower. The system asks lenders having a tax refund if they would like to loan some or all of the return to other people. The system then presents loan options to the lenders. If the lenders choose to make a loan, the lenders instruct the system to enter into a loan for a specified amount on agreed to loan terms, and the loan amount is then transferred to the borrower, funded either directly or indirectly by the tax refund.

Figure 1A:
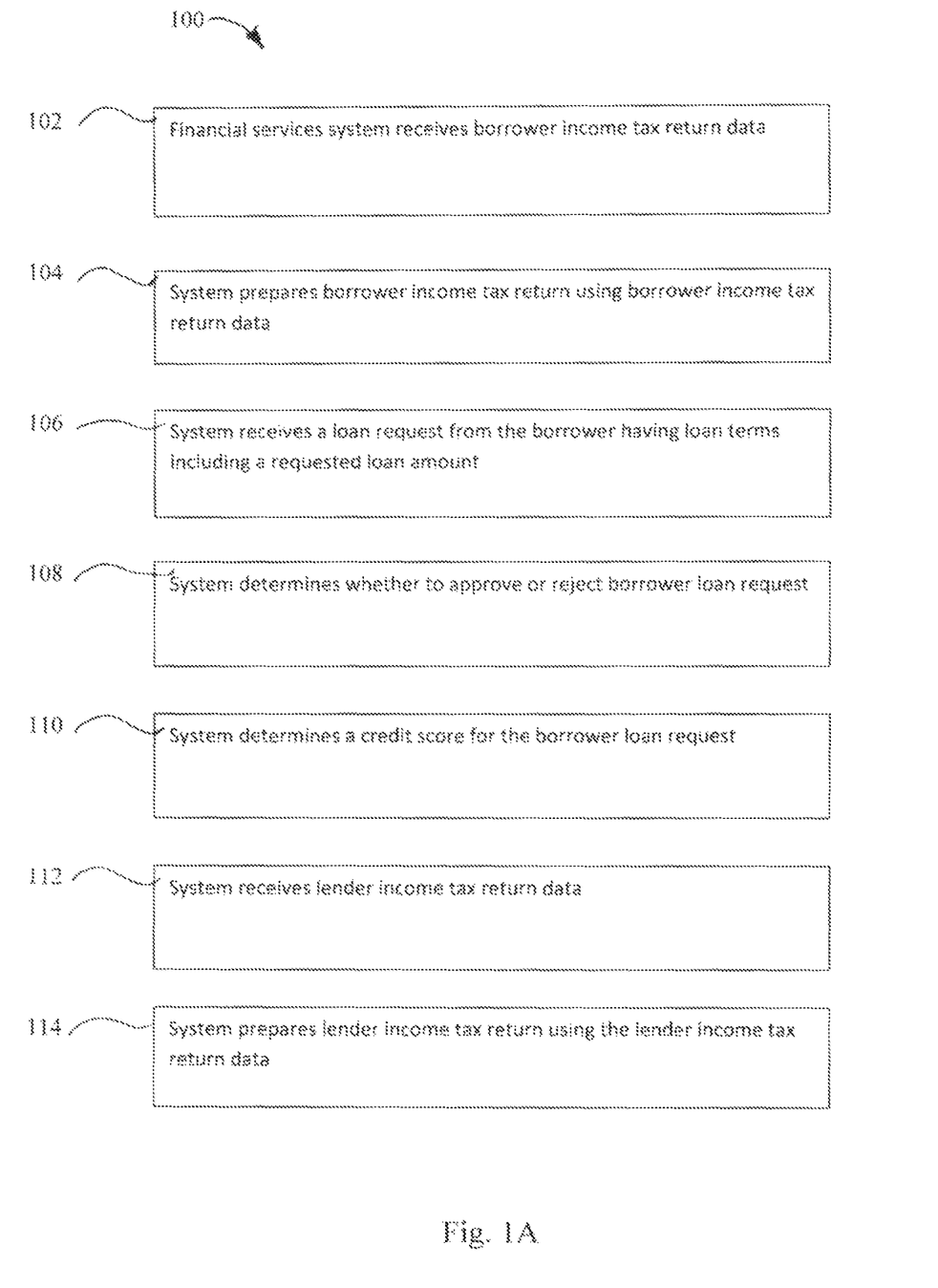
FIGS. 1A-1C are a flow chart of a method for facilitating a loan between a borrower and a lender, according to one embodiment of the present invention.
Figure 1B:
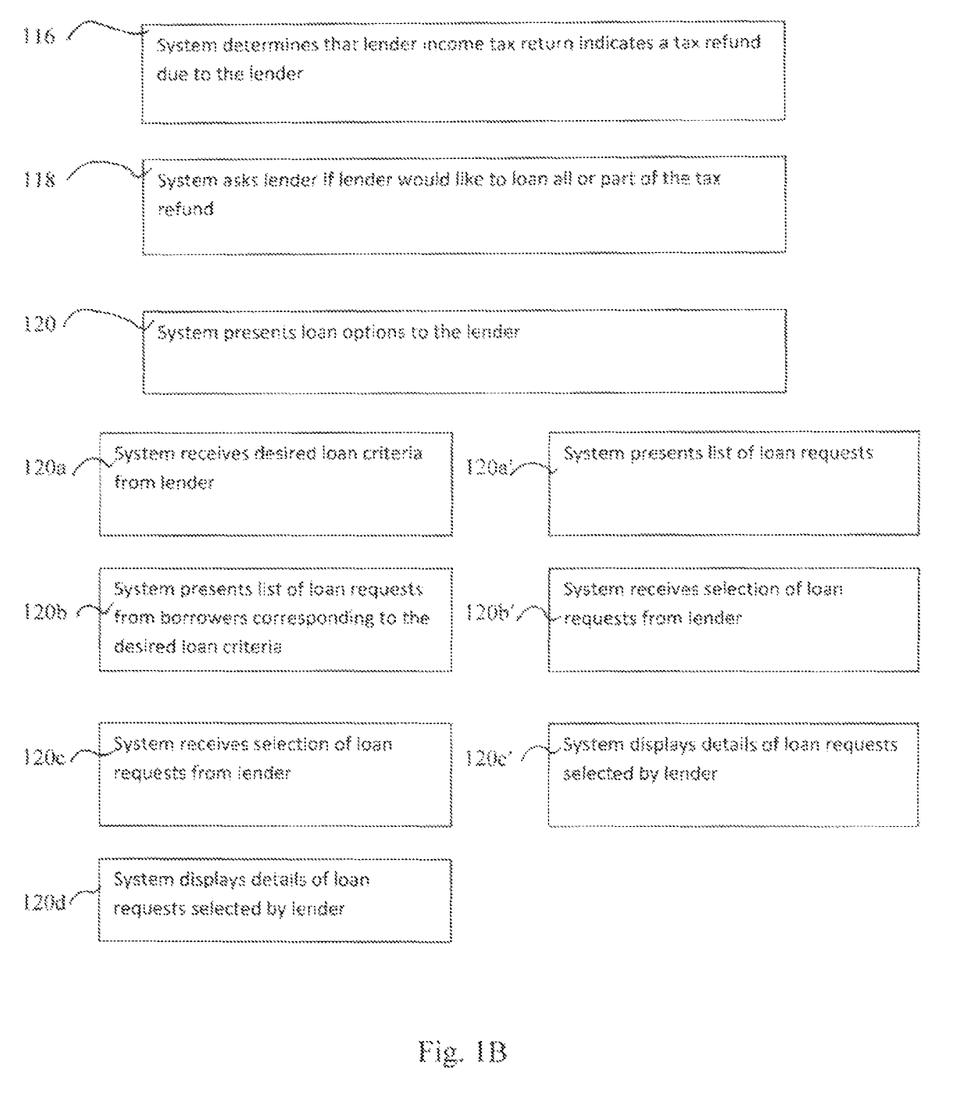
Figure 1C:
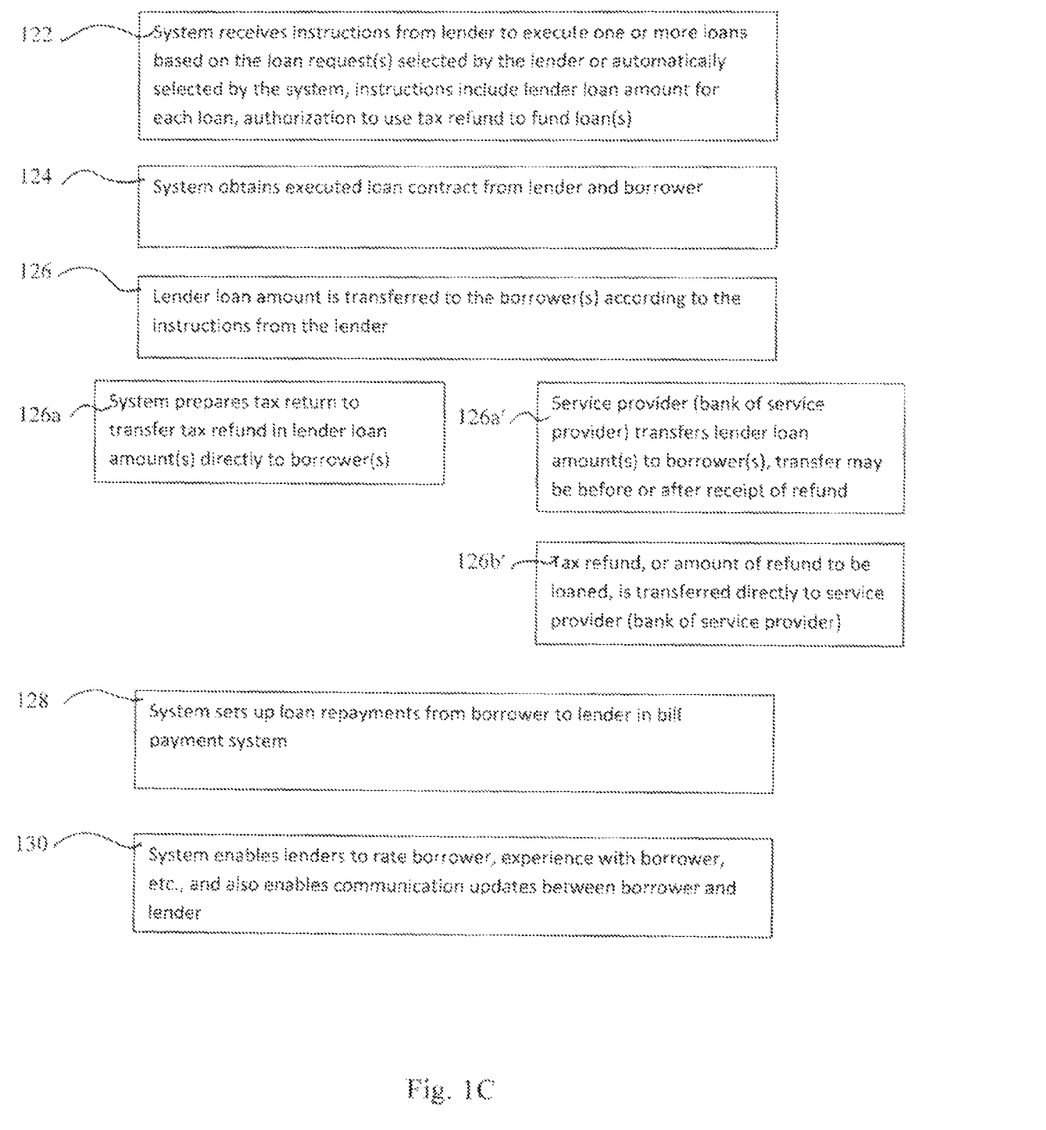

Referring to FIG. 1, in one embodiment, a computerized method 100 for facilitating a loan between a borrower and a lender in an online financial services system is shown. The online financial services system is generally provided by a service provider such as an electronic tax return preparation service and/or financial institution, such as a bank, stock broker or other financial services company, an online financial system service/application provider such as Intuit Inc., the provider of Turbotax®.

The methods of the present invention are applicable to online financial services systems which provide online services to consumers, accessible through the internet and/or other electronic communication system such as cellular phone communications. However, not all of the system is required to be online. For example, the tax return preparation application may be a desktop application, while other parts of the system, such as the loan processing application, bill payment (for loan repayment) and submission of a completed tax return, may be online.

As further described below, the method 100 will typically be implemented on an online financial services system (also referred to as "system") comprising one or more computers, data storage servers, and a website server which is in communication with the internet. The computers, servers and website server are operably connected via a communication network. The system may also be in communication with other financial institutions and data services through a network, typically comprising a combination of private networks and secure internet connections, in order to communicate and access financial data, such as a borrower's credit ratings. The computer(s) of the system are configured to enable a website accessible by users through the internet. The website server may include multiple computer servers. The online application is then accessible to a user via a computer connected to the internet. The system may also have communication interface(s) to allow a user to use the system using cellular communications on devices like mobile phone, smart phones, and other portable cellular devices. The user interface for the online applications can be an internet browser or specialized software residing on the local computer. Furthermore, the system application may be a stand-alone application, or it may be integrated into another software application. For instance, the software program for enabling the loan method 100 may be integrated into a basic account financial services system application, or even a financial services system having both account functions and an integrated personal finance management application such as FinanceWorks™ available from Intuit Financial Services, a unit of Intuit Inc., of Mountain View, Calif., Quicken® online, available from Intuit Inc., Mountain View, Calif., or Mint®, available at the website MINT.COM.

The method 100 comprises a step 102 in which the financial services system receives borrower income tax return data. This step is enabled using the tax return preparation application of the system. As a desktop application or an online application, the use of the tax preparation application to prepare a computerized tax return is basically the same. Some tax preparation applications present a list of tax-related questions or data entry fields to the user as a series of interview screens or fillable forms, and the user responds by entering the appropriate data or answers if they are known. Certain interview screens or questions obtain personal and family information such as the taxpayer's social security number, marital status, number of dependents, etc. Further interview screens and questions ask for the taxpayer's finances such as wages, retirement plan contributions, and social security, interest paid on home loans, state and federal taxes that were paid or withheld as provided in Form-W2. The data fields of an electronic tax return may be entered in many other ways, as well. The income tax return data may also be entered into the electronic tax return in various other methods, such as by filling in data fields in a fillable form, the data may be electronically imported from financial service providers of the taxpayer (such as banks, stock brokers, financial planners, etc.), the data may be transferred from another database on the computer or remotely stored on a different computer or storage device/server, and/or the data may be transferred from a previous year's tax return, or from any other suitable source.

Upon entry of all of the borrower income tax return data, at step 104 the tax preparation application of the financial services system calculates and prepares an electronic tax return for the borrower. The completed electronic tax return will include the amount of tax payments made by the taxpayer, such as amounts withheld, estimated tax payments, and any tax credits due to the taxpayer. The completed electronic tax return will also include the total income tax due to be paid by the taxpayer. If the amount of tax payments exceeds the total income tax due, then the tax return indicates that a tax refund is due to the taxpayer. If the total income tax due exceeds the amount of tax payments, then the taxpayer owes an additional tax payment. The electronic tax return may then be formatted as necessary and electronically filed with a tax authority such as the Internal Revenue Service, a state tax authority, or other tax collecting entity, or it may be printed and mailed to the appropriate tax authority, or it submitted in any other suitable manner.

In the case of a tax return that indicates a tax refund due to the taxpayer, the taxpayer can choose to receive the tax refund in various ways. For example, the taxpayer can elect to have all or part of the tax refund applied as an estimated tax payment for the subsequent tax year, and/or the taxpayer can choose to have all or part of the tax refund paid back to the taxpayer as a direct deposit to a financial account of the taxpayer or a check sent to the taxpayer.

At step 106, the financial services system receives a loan request from the borrower. The system may advise borrowers of the loan program offered by the service provider, and ask borrowers using the system if they want to apply for a loan. This may be before, during or after the borrower's income tax return data is entered into the system and the income tax returns are prepared by the system. The system may ask the borrower for the purpose of the loan, such as a list of choices like (a) to pay off other loans, (b) make a purchase, (c) finance a business, or (c) for some other purpose which the borrower can fill-in. At this point, the system may analyze the borrower's income tax data to determine if the borrower is a good candidate to request a loan. Advantageously, the system has a good deal of financial information about the borrower as a result of preparing the borrower's tax return. The system has income information, home information, debt information (such as home loans), asset information (property tax deductions), as some examples. The system analyzes this information to determine a rating of loan attractiveness for the borrower. This initial evaluation may be used to qualify lenders, and the system may use the rating to reject or accept borrowers, or it may just be used to give borrowers an assessment of their loan attractiveness and the chance that the borrower will obtain a loan using the loan program.

If the borrower remains interested in requesting a loan, the system requests loan terms from the borrower, such as the requested loan amount, interest rate (e.g. fixed rate, adjustable rate tied to a benchmark like prime rate, etc.), loan period and/or repayment schedule (e.g. fully amortized, interest only with balloon payment, adjustable interest rate, etc.). The system may have restrictions on the loan terms, such as minimum and maximum loan amount, minimum and maximum interest rate, minimum and maximum loan period, and specified loan repayment schedules. The system may also provide to the borrower a suggested loan amount, interest rate, loan period and/or repayment schedule. The borrower enters, and the system receives, the loan request from the borrower including these loan terms.

At step 108, the system may optionally determine whether to approve or reject the loan request. This step is optional. In other words, the system may simply approve all loan requests to be put into the system as loan requests waiting to be accepted by a lender, as described below. Or, the system may analyze the loan request and the borrower's credit information, including the borrower's income tax return data (which may include data from previous years' tax history), employment history, existing loans, and/or credit ratings obtained from credit reporting bureaus like Equifax™, Experian™ and TransUnion™, or for corporate borrower's, from credit rating agencies like Standard & Poor's ™, Moody's™ and Dun & Bradstreet™. Based upon this analysis, the system determines whether to reject the loan request, or approve the loan request to be placed into the loan program.

At step 110, the system determines a credit score for the borrower loan request. This may be done simultaneously with step 108, or it may be separate. Similar to step 108, the system analyzes the borrower's income tax return data, employment history, existing loans, and/or credit ratings obtained from credit reporting bureaus or credit rating agencies, and determines a credit score for the borrower loan request. The credit score may be a numerical score, a letter grade (such as A-D), relative descriptors such as a scale like excellent, very good, good, fair, poor, or other suitable scoring system.

At this point, the borrower loan request is put into the loan program of the system. The loan request can then be reviewed by lenders, and potentially accepted and funded by one or more lenders.

At step 112, the system receives lender income tax return data. Step 112 is the same as step 102, except that the tax data is regarding the lender instead of the borrower. Accordingly, all of the description above regarding step 102 applies to step 112.

At step 114, upon entry of all of the lender income tax return data, the tax preparation application of the financial services system calculates and prepares an electronic tax return for the lender. Step 114 is the same as step 104, except that the tax return is for the lender instead of the borrower, and all of the description above regarding step 104 applies to step 114. At step 116, the system determines that the lender income tax return indicates a tax refund is due to the lender. In other words, the lender has paid more income tax than the lender owes for the particular tax period. Thus, the lender has a tax refund that the lender may loan to the borrower, if the lender so desires.

At step 118, the system asks the lender if the lender would like to consider lending all or part of the lender's tax refund. The system may advise the lender of the loan program, and describe how it works. The system can advise the lender that there is no obligation to review loan options and loan requests.

If the lender answers affirmatively at step 118, then at step 120, the system presents loan options to the lender. The loan options may be specific loan requests from borrowers, or options for desired loan criteria, such as loan amount, interest rate, loan period, location of borrower, credit rating, and the like, or desired ranges of the foregoing. As shown in steps 120a'-120c', one of the simplest ways to display loan options is to simply display a list of loan requests from borrowers, from which the lender can review, scan, and select specific loan requests and/or details of specific loans request. The list can include some of the details of each loan request so that the lender can decide if certain loans look attractive to them. For example, the list may include the request loan amount, interest rate, and loan period, without disclosing the borrower name. At step 120b', the system allows the user to select loan requests from the list that interest the lender. Then, at step 120c', the system displays additional details of the loan request(s) selected by the lender.

A more sophisticated method of presenting loan requests is shown in steps 120a-120d. At step 120a, the system receives desired loan criteria from the lender. This can be done by any suitable method, such as by displaying to the lender various loan criteria and selections for each loan criterion. For example, the system may display: loan amounts and a selection of loan amounts or loan amount ranges, such as $500-$1000, $1000-$2000, $2000-$5000, $5000-$10000, etc.; loan periods and a selection of loan periods, such as 3-6 months, 6 months—one year, 1-2 years, 3-5 years, etc.; loan purpose, such as pay-off other loan, make purchase, finance a business, etc.; geographic location of the borrower, such as state, or region, or the like; etc. At step 120b, the system presents list of loan requests from borrowers corresponding to the desired loan criteria selected by the lender. At step 120c, the system allows the user to select loan requests from the list that interest the lender. Then, at step 120d, the system displays additional details of the loan request(s) selected by the lender.

These are just two examples, and are not limiting of the invention, as the invention includes any suitable method of displaying loan options such that one or more loan requests can be selected by the lender, or the lender can choose desired loan criteria such that the system can automatically select one or more loan requests meeting the desired loan criteria. Moreover, the system can enable one or more of the methods for presenting loan options, such as by asking the lender to select one of multiple methods. For instance, the system can allow the chooser to select either the method of steps 120a-120d, or the method of steps 120a'-120c', or other suitable method.

At step 122, the system receives instructions from lender to execute one or more loans based on the loan request(s) selected by the lender or automatically selected by the system. The system may allow the user to select desired loan requests from the loan options presented in step 120. This may be done in any suitable manner. For instance, the lender may select certain loan requests from a list generated in step 120. Alternatively, the system may automatically select loan requests which meet desired loan criteria entered by the lender. The automatic selection may be done from a queue of loan requests, such as first in, first out, such that the first loan request entered into the system which meets the desired loan criteria is selected first to be executed.

The instructions from the lender include the lender loan amount, which may be the full amount of the requested loan amount for the selected loan request, or less than the full amount. For example, several lenders may select to enter into a loan for a single loan request, wherein each lender loans a portion of the full requested loan amount. As another example, the lender may instruct the system to execute loans for multiple loan requests, each for a lender loan amount. The lender loan amount for each loan is allocated from the tax refund. The lender loan amount is typically less than the amount of the lender's tax refund available to make the loan. Still, the invention also contemplates that the lender loan amount may be more than the available tax refund of the lender, and the lender can make up the difference using another form of payment, such as an electronic funds transfer, a check, a credit or debit card payment, or other suitable form of payment.

The instructions from the lender also include authorization to use the lender's tax refund to fund the loan. The use of the lender's tax refund to the fund the loan may be direct or indirect, as described in more detail below. The instructions may further include the process by which the tax refund will be used to fund the loan. For instance, the instructions may assign the tax refund to the service provider, such that the service provider will transfer the lender loan amount to the borrower from an account of the service provider. Alternatively, the instructions may be to send the lender loan amount of the tax refund directly from the tax authority (such as the Internal Revenue Service, or state tax authority) to the borrower. The instructions for the method may set forth in the loan request of the borrower, and then confirmed by the lender by selecting the loan request to enter into.

At step 124, the system executes the loan between the lender and the borrower. In one way, the system may send electronic copies of loan documents, including a loan agreement, to the lender and borrower for execution by the lender and borrower. The loan agreement includes the terms upon which the loan has been agreed to, such as the loan amount, loan period, repayment schedule, and/or method of repayment. The system may allow the lender and borrower to electronically execute the loan agreement, such as by an online acceptance such as a check box and confirmation, filling in a form and confirming, or a specified response to an email or other electronic communication.

At step 126, the lender loan amount is transferred to the borrower. As stated above, the loan can be funded by the lender's tax refund directly or indirectly. As shown in step 126a, if the loan is funded directly by the tax refund, then the system prepares the lender's tax return to send the lender loan amount of the tax refund directly to the borrower, such as by making an electronic funds transfer to an account of the borrower or by sending a check to the borrower. The lender loan amount may be paid by any suitable means, including by an electronic funds transfer, a check, a prepaid debit card, or a prepaid credit card, etc.

There are a number of indirect ways in which the lender's tax refund can be used to fund the loan. On method is shown in steps 126a'-126b'. At step 126a', the service provider, such as a bank or financial institution of the service provider, transfers lender loan amount for each loan to each borrower. This transfer may occur before or after the lender's tax refund is received by the service provider (such as service provider's bank or other financial institution). At step 126b', the tax refund, or amount of refund to be loaned, is paid directly to the service provider. Accordingly, the system prepares the lender's tax return such that the lender loan amount of the lender's tax refund is paid to the service provider. In another method (not shown), the lender may authorize for the full amount of the lender's tax refund, which is more than the lender loan amount, to be paid to the service provider, and then the service provider pays the lender loan amount to the borrower and pays the remainder of the tax refund to the lender. The payments may be made before or after the tax refund is paid to the service provider.

At step 128, the financial services system may optionally set up loan repayments from borrower to lender in a bill payment system or payroll. For instance, the financial services system may include a bill payment system, or it may have a payroll system, for which the borrower may already have an account, or for which the borrower may set up an account. Then, the system can set up automatic loan payments from an account of the borrower to an account of the lender, or as a payroll deduction from the borrower's payroll payments. This will help ensure that timely payments are made on the loan by the borrower. In addition, agreement to use this option can be used to increase the credit rating of a loan request determined in step 110.

At step 130, the system may also include a user feedback system which allows users, including both lenders and borrowers, to give ratings and provide comments. The system may prompt lenders and borrowers to give feedback by sending emails or other alerts asking the users provide feedback. The users can then access the system online and fill out questionnaires and provide comments. For instance, a lender can rate a borrower based upon timeliness of loan payments, or other comments. The system can also enable communication between borrowers and lenders, such as allowing a borrower to advise a lender that a payment is going to be late, or that early repayment is going to be made. A lender to remind a borrower that payment is due, or overdue. The lender and borrower ratings and comments may be made available to other users of the financial services system, so that they can use them to make decisions on whether to enter into loans with certain lenders and borrowers.

Accordingly, the method 100 provides an innovative method for facilitating a loan between a consumer borrower and a lender using a financial services system having a tax return preparation application in which the loan is funded by a tax refund of a lender.

Figure 2:
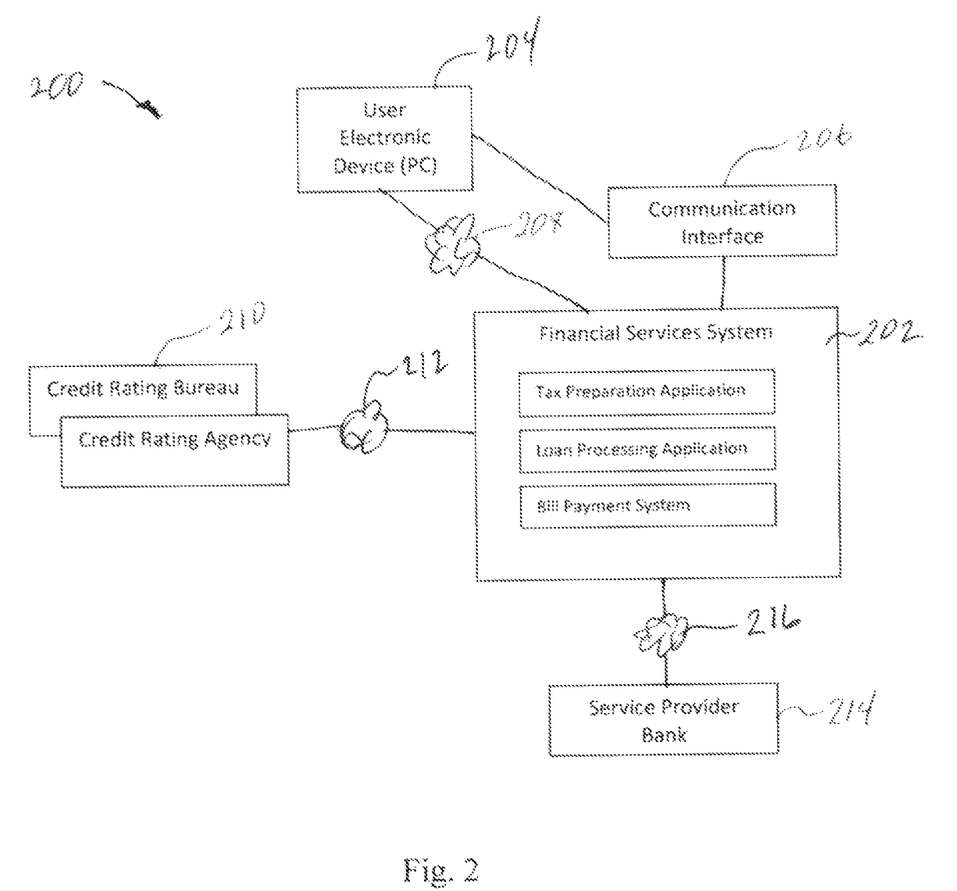
FIG. 2 illustrates a system for facilitating a loan between a consumer borrower and a lender, according to another embodiment of the present invention.

Referring now to FIG. 2, a non-limiting example of a system 200 for implementing the method 100, as shown in FIGS. 1A-1C, as well as other method embodiments that may be described herein, is depicted. It should be understood that not all of the components of the system 200 may be needed to implement each of the methods of the present invention, and therefore, the system may include only those components necessary to perform the method embodiments as described herein.

The system 200 comprises an online financial services system 202 comprising one or more computers, data storage servers and a website server which is in communication with the internet 206. The online financial services system 202 has a tax preparation application, a loan processing application and a bill payment system. These applications of the online financial services system 202 may be separate and linked through a communication network, or integrated into one large system. The tax preparation application, loan processing application and bill payment system are configured to perform the steps of the method 100, as well as any other method embodiments described herein. Accordingly, the website server includes pages, files and programming to interact with a user electronic device 204, such as a personal computer through the internet 208, or a cellular communication device such as a smart phone through a communication interface 206. A user accesses and utilizes the online financial services system 202 through a computer 204 connected to the internet 208 using a web browser. The website server may be a collection of servers in operable communication with each other in which at least one of the servers is connected to the internet 206. The financial services system 202 also has access to a plurality of credit rating bureaus and agencies 210 through a suitable communication network 212, which may include a proprietary network, LAN, WAN, cellular network, wireless network, the internet and/or other suitable network.

A bank or financial institution 216 of the service provider is also connected to the financial services system 202 through a communication network 216, which may include a proprietary network, LAN, WAN, cellular network, wireless network, the internet and/or other suitable network Accordingly, a system 200 is provided which can facilitate a loan between a borrower and a lender in an online financial services system according to any of the methods described herein.

The method 100, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the method 100, as well as any other method embodiments and aspects described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Accordingly, an article of manufacture is provided which can facilitate a loan between a consumer borrower and a lender in an online financial services system according to any of the methods described herein.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the method shown in FIGS. 1A-1C is not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for facilitating a loan between a borrower and a lender, the method comprising:
    a computerized financial services system receiving borrower income tax return data and lender income tax return data and preparing respective borrower and lender income tax returns using respective borrower and lender tax return data;
    the computerized financial services system determining that the lender income tax return indicates a tax refund is due to the lender;
    the computerized financial services system receiving desired loan criteria of the lender;
    the computerized financial services system receiving a loan request from the borrower, the loan request including loan terms;
the computerized financial services system determining a credit score of the borrower based at least in part on an analysis of the income tax return data of the borrower;
    the computerized financial services system determining that the loan terms and credit score satisfy the lender's desired loan criteria and presenting the loan request to the lender, the loan request comprising the borrower's credit score and loan terms comprising requested loan amount, interest rate and loan period; and
    the computerized financial services system receiving instructions from the lender to execute a loan to the borrower based at least in part upon the loan terms, the instructions including a lender loan amount to be loaned by the lender to the borrower, the lender loan amount being less than or equal to the requested loan amount, the instructions also including authorization from the lender to use at least part of the tax refund to fund the loan.

2. The method of claim 1, wherein receiving desired loan criteria of the lender comprises:
    the computerized financial services system presenting a selection of loan criteria to the lender, the loan criteria including loan amount, interest rate, and loan period to be selected or specified by the lender; and
    the computerized financial services system receiving the desired loan criteria from the lender.

3. The method of claim 1, the computerized financial services system preparing the lender tax return such that the lender loan amount of the tax refund is paid to the borrower.

4. The method of claim 1, the computerized financial services system preparing the lender tax return such that the lender loan amount of the tax refund is transferred to a service provider that operates the computerized financial management system, the computerized financial management system transferring the lender loan amount to the borrower.

5. The method of claim 1, wherein the lender loan amount is less than the requested loan amount, and further comprising:
    the computerized financial services system receiving second lender income tax return data for a second lender and preparing a second lender income tax return using the second lender tax return data;
    the computerized financial services system determining that the second lender income tax return indicates a second lender tax refund is due to the second lender;
    the computerized financial services system receiving desired loan criteria of the second lender;
the computerized financial services system determining that the loan terms and credit score satisfy the second lender's desired loan criteria and presenting the loan request to the second lender;
    the computerized financial services system receiving second instructions from the second lender to execute a second loan to the borrower based at least in part upon the loan terms, the second instructions including a second lender loan amount to be loaned to the borrower, a sum of the second lender loan amount and the lender loan amount being less than or equal to the requested loan amount, the second instructions also including authorization from the second lender to use at least part of the second lender tax refund to fund the second loan;
    the computerized financial services system executing instructions for transferring the second lender loan amount to the borrower according to the instructions from the second lender.

6. The method of claim 1, further comprising the step of setting up loan repayments from the borrower to the lender in a bill payment system.

7. The method of claim 1, further comprising the step of the computerized financial services system setting up loan repayments from the borrower to the lender in a bill payment system.

8. The method of claim 1, wherein the computerized financial services system presents to the lender a list of a plurality of loan requests which meet the lender's desired loan criteria including the loan request from the borrower; and wherein the loan from the lender to the borrower is executed based at least in part upon instructions from the lender comprising selection of the loan request corresponding to the borrower's loan request.

9. The method of claim 1, wherein the computerized financial services system comprises a tax preparation application operable to prepare an electronic tax return.

10. A system for facilitating a loan between a borrower and a lender, comprising:
    an online financial services system comprising at least one or more computers, a website server, one or more data storage servers and a website server which is in operable communication with the internet, the online financial services system having a tax preparation application configured to receive tax return data and prepare a tax return based on the tax return data and a loan processing application configured to process a loan between the borrower and the lender, the online financial services system configured to perform a process comprising:

receiving borrower income tax return data and lender income tax return data and preparing a borrower income tax return and a lender income tax return using respective borrower and lender tax return data;

determining that the lender income tax return indicates a tax refund is due to the lender;

receiving desired loan criteria of the lender;

receiving a loan request from the borrower, the loan request including loan term;

determining a credit score of the borrower lender based at least in part on an analysis of the income tax return data of the borrower;

determining that the loan terms and credit score satisfy the lender's desired loan criteria and presenting the loan request to the lender, the loan request comprising the borrower's credit score and loan terms including requested loan amount, interest rate and loan period; and receiving instructions from the lender to execute a loan to the borrower based at least in part upon the loan terms, the instructions including a lender loan amount to be loaned by the lender to the borrower, the lender loan amount being less than or equal to the requested loan amount, the instructions also including authorization from the lender to use at least part of the tax refund to fund the loan.

11. The system of claim 10, wherein receiving desired loan criteria of the lender comprises:

presenting a selection of loan criteria to the lender, the loan criteria including loan amount, interest rate, and loan period to be selected or specified by the lender; and receiving the desired loan criteria from the lender.

12. The system of claim 10, wherein the online financial services system is further configured to perform a process step comprising preparing the lender tax return such that the lender loan amount of the tax refund is paid to the borrower.

13. The system of claim 10, wherein the online financial services system is further configured to perform a process step comprising preparing the lender tax return such that the lender loan amount of the tax refund is transferred to a service provider that operates the online financial services system, the online financial services system being configured to transfer the lender amount to the borrower.

14. The system of claim 10, wherein the lender loan amount is less than the requested loan amount, and the online financial services system is further configured to perform process steps comprising:

receiving second lender income tax return data for a second lender and preparing a second lender income tax return using the second lender tax return data;

determining that the second lender income tax return indicates a second lender tax refund amount is due to the second lender;

receiving desired loan criteria of the second lender;

determining that the loan terms and credit score satisfy the second lender's desired loan criteria and presenting the loan request to the second lender;

receiving second instructions from the second lender to execute a second loan to the borrower, the second instructions including a second lender loan amount to be loaned to the borrower, a sum of the second lender loan amount and the lender loan amount being less than or equal to the requested loan amount, the second instructions also including authorization from the second lender to use at least part of the second lender tax refund to fund the second loan; and executing instructions for transferring the second lender loan amount to the borrower according to the instructions from the second lender.

15. The system of claim 10, wherein the online financial services system is further configured to perform the step of setting up loan repayments from the borrower to the lender in a bill payment system.

16. The system of claim 11, wherein the online financial services system presents to the lender a list of a plurality of loan requests which meet the lender's desired loan criteria including the loan request from the borrower; and wherein the loan from the lender to the borrower is executed based at least in part upon instructions from the lender comprising selection of the loan request corresponding to the borrower's loan request.

17. An article of manufacture comprising a non-transitory computer program carrier readable by a computer and embodying instructions executable by the computer to perform the method steps of programming a computer to perform the following steps:

receiving borrower income tax return data and lender income tax return data and preparing a borrower income tax return and a lender income tax return using respective borrower and lender tax return data;

determining that the lender income tax return indicates a tax refund is due to the lender;

receiving desired loan criteria of the lender;

receiving a loan request from the borrower, the loan request including loan terms;

determining a credit score of the borrower based at least in part on an analysis of the income tax return data of the borrower;

determining that the loan terms and credit score satisfy the lender's desired loan criteria and presenting the loan request to the lender, the loan request comprising the borrower's credit score and loan terms including requested loan amount, interest rate and loan period; and receiving instructions from the lender to execute a loan to the borrower based at least in part upon the loan terms, the instructions including a lender loan amount to be loaned by the lender to the borrower, the lender loan amount being less than or equal to the requested loan amount, the instructions also including authorization from the lender to use at least part of the tax refund to fund the loan.

18. The article of manufacture of claim 17, wherein receiving desired loan criteria of the lender comprises:

presenting a selection of loan criteria to the lender, the loan criteria including loan amount, interest rate, and loan period to be selected or specified by the lender; and receiving desired loan criteria from the lender.

19. The article of manufacture of claim 17, further comprising instructions executable by the computer to perform the further method step of preparing the lender tax return such that the lender loan amount of the tax refund is paid to the borrower.

20. The article of manufacture of claim 17, further comprising instructions executable by the computer to perform the further method steps of:

preparing the lender tax return such that the lender loan amount of the tax refund is transferred to a service provider that operates the online financial services system, the online financial services system transferring the lender loan amount to the borrower.

21. The article of manufacture of claim 17, further comprising instructions executable by the computer to perform the further method step of setting up loan repayments from the borrower to the lender in a bill payment system.

22. The article of manufacture of claim 18, further comprising instructions executable by the computer to present to the lender a list of a plurality of loan requests which meet the lender's desired loan criteria including the loan request from the borrower; and wherein the loan from the lender to the borrower is executed based at least in part upon instructions from the lender comprising selection of the loan request corresponding to the borrower's loan request.

* * * * *